United States Patent
Wu

(10) Patent No.: US 9,255,849 B2
(45) Date of Patent: Feb. 9, 2016

(54) TEMPERATURE COMPENSATION APPARATUS, METHODS, AND SYSTEMS

(75) Inventor: Dagang Wu, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1011 days.

(21) Appl. No.: 13/406,196

(22) Filed: Feb. 27, 2012

(65) Prior Publication Data

US 2013/0226460 A1 Aug. 29, 2013

(51) Int. Cl.
*G01K 1/20* (2006.01)

(52) U.S. Cl.
CPC .................................. *G01K 1/20* (2013.01)

(58) Field of Classification Search
CPC ......... B01D 29/111; E21B 1/00; E21B 10/00; E21B 47/21; C10M 1/00; G01V 11/002; G01V 11/007; G01K 13/08
USPC ........ 374/1, 100, 208; 73/1.01; 702/1, 11, 85, 702/108
See application file for complete search history.

(56) References Cited

U.S. PATENT DOCUMENTS

| | | | | |
|---|---|---|---|---|
| 3,656,344 A * | 4/1972 | Johns | .................... | E21B 47/065 33/314 |
| 6,108,605 A * | 8/2000 | Doyle | ...................... | G01V 3/28 324/339 |
| 6,378,627 B1 * | 4/2002 | Tubel et al. | ....................... | 175/24 |
| 6,381,542 B1 * | 4/2002 | Zhang | ...................... | G01V 3/38 702/7 |
| 6,594,602 B1 * | 7/2003 | Schultz | ................. | G01D 3/022 702/104 |
| 6,832,159 B2 * | 12/2004 | Smits | ..................... | G01V 11/00 702/11 |
| 7,138,897 B2 * | 11/2006 | Minerbo et al. | ................ | 336/90 |
| 8,073,623 B2 * | 12/2011 | Hartmann | .............. | G01V 11/00 166/250.01 |
| 8,549,857 B2 * | 10/2013 | Papile | .......................... | 60/641.2 |
| 2004/0257240 A1 * | 12/2004 | Chen | ........................ | G01V 3/38 340/853.1 |
| 2007/0121701 A1 * | 5/2007 | Gennissen | ............. | G01K 13/02 374/143 |
| 2008/0290876 A1 * | 11/2008 | Ameen | ......................... | 324/346 |
| 2009/0001974 A1 * | 1/2009 | Sheiretov et al. | ............. | 324/209 |
| 2009/0309591 A1 * | 12/2009 | Goodman | ................ | G01V 3/24 324/303 |
| 2010/0077752 A1 * | 4/2010 | Papile | .......................... | 60/641.8 |
| 2012/0255774 A1 * | 10/2012 | Grubb et al. | .................... | 175/16 |
| 2014/0038070 A1 * | 2/2014 | Papile | ........................... | 429/410 |

OTHER PUBLICATIONS

Aref, S.H., Latifi, H. et al., Fiber optic Fabry-Perot pressure sensor with low sensitivity to temperature changes for downhole application, Science Direct, Optics Communications, pp. 322-330, Aug. 2006.*

* cited by examiner

*Primary Examiner* — John Breene
*Assistant Examiner* — Jeffrey Aiello
(74) *Attorney, Agent, or Firm* — Schwegman Lundberg & Woessner, P.A.; Benjamin Fite

(57) ABSTRACT

In some embodiments, an apparatus and a system, as well as a method and an article, may operate to receive down hole tool environmental temperature data, axial temperature data, radial temperature data, and log data. Further activity may include applying temperature effects compensation associated with the environmental temperature data and the down hole log data using a fitting function model obtained from a trained neural network to transform the down hole log data into corrected log data. Additional apparatus, systems, and methods are described.

22 Claims, 9 Drawing Sheets

TEMPERATURE COMPENSATION APPARATUS, METHODS, AND SYSTEMS

BACKGROUND

Understanding the structure and properties of geological formations can reduce the cost of drilling wells for oil and gas exploration. Measurements made in a borehole (i.e., down hole measurements) are typically performed to attain this understanding, to identify the composition and distribution of material that surrounds the measurement device down hole. To obtain such measurements, a variety of sensors are used. Since borehole temperature, which varies widely, can significantly affect the operation of such sensors, it is sometimes useful to adjust down hole logging data to improve measurement accuracy.

DETAILED DESCRIPTION

Figure 1:
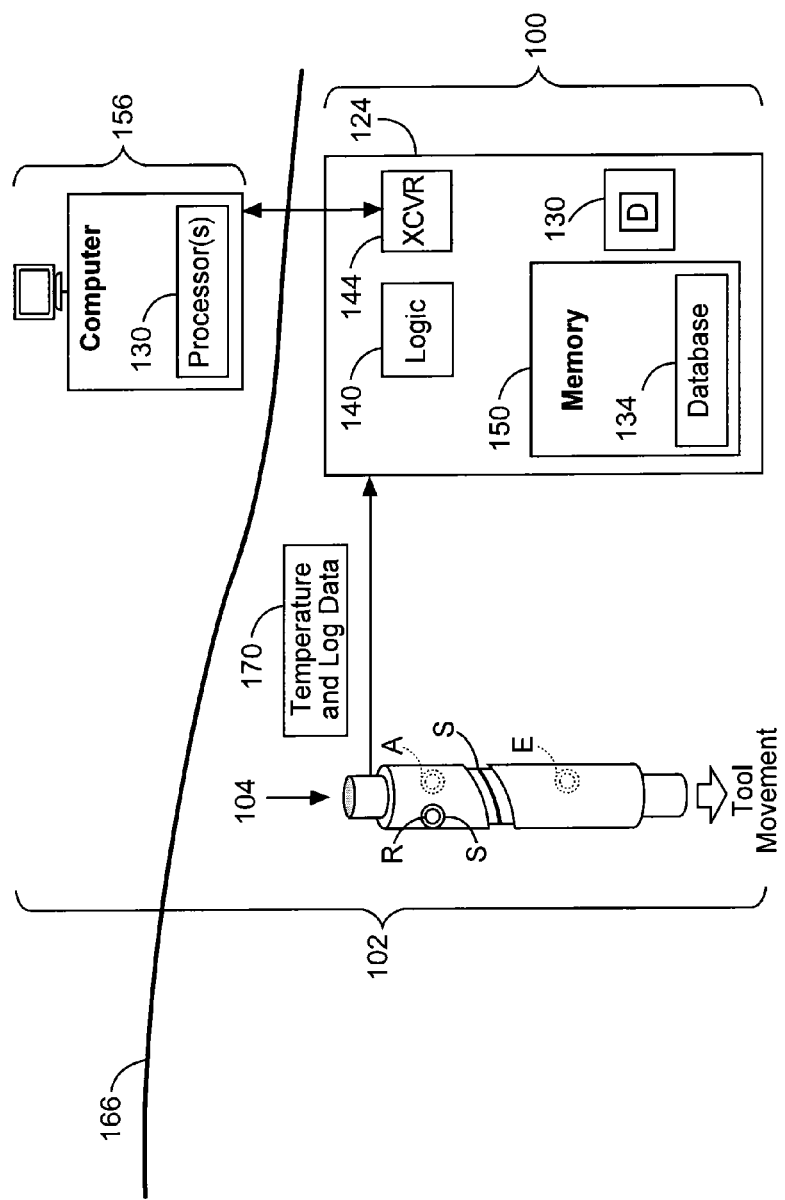
FIG. 1 is a block diagram of apparatus and systems according to various embodiments of the invention.

To address some of the challenges described above, as well as others, apparatus, systems, and methods are described herein that enable the use of sensors with relatively high temperature sensitivity in down hole applications. Various embodiments of the invention can be used to correct down hole log data (e.g., resistivity logs) by removing or compensating for temperature effects.

A neural network may be applied to implement some forms of compensation. This includes temperature correction applied to an array induction tool. Other temperature-sensitive induction tools, such as a multi-component induction tool, or a slim induction tool, may also benefit. Compared to polynomial curve fitting methods, laboratory results show that neural network methods provide better fitting results in a variety of situations, such as when applied to the Hostile Array Compensated Resistivity Tool (H-ACRt™) logging system, available from Halliburton of Houston, Tex. Compensation can be even more useful when signal noise is present and/or when the induction array has short spacing (e.g, less than one meter of distance) between the coils. To introduce the neural network approach to temperature compensation, the theoretical background, temperature sensor configuration, temperature estimation, and fitting model selection will now be described.

To begin, one may consider a logging tool that has a sonde section and an electronics section. When employed down hole, the surrounding temperature may cause measurement drift within the electronics section, which in turn produces a change in the response of the sonde.

The sonde response change with temperature is referred to herein as the "temperature effect." Overall, the temperature effect is a complicated function of the temperature and temperature distribution inside the tool body. To correct the temperature effect, a fitting model is often useful. The more accurate the fitting model, the more accurate the correction of the temperature effect.

The temperature distribution inside a tool body can be visualized by imagining a thick-walled hollow metal tube with a point "A" in the wall that lies a short distance from the hollow inner portion. The temperature of point "A" is designated as $T_A$. The temperature effect ($\Delta\sigma_T$) at point "A" is generally a nonlinear function of two terms: $T_A$, and the derivative of $T_A$ with respect to time. This is shown in equation (1):

$$\Delta\sigma_T = f\left(T_A, \frac{\partial T_A}{\partial t}\right). \tag{1}$$

A polynomial function can be used to approximate this function. For instance, equation (1) can be expressed as a third-order polynomial, where the polynomial coefficients $a_0$, $a_1$, $a_2$, $a_3$, $b_1$, $b_2$, and $b_3$ can be determined by using experimental least-squares fitting methods:

$$\Delta\sigma_T = a_0 + a_1(T_A) + a_2(T_A)^2 + \\ a_3(T_A)^3 + b_1\left(\frac{\partial T_A}{\partial t}\right) + b_2\left(\frac{\partial T_A}{\partial t}\right)^2 + b_3\left(\frac{\partial T_A}{\partial t}\right)^3. \tag{2}$$

However, equation (2) is only an approximation of the nonlinear function shown in equation (1), so equation (2) does not always provide the desired accuracy for the temperature effect observed at point "A". Thus, higher order polynomial functions are sometimes used. In each case, polynomial fitting methods are often sensitive to noise.

In many embodiments, a neural network method, also known as an artificial neural network method, is applied to characterize behaviors of the temperature effect on down hole sensors, including sensors used in induction tools. As part of this method, a variety of neural network models can be applied to approximate nonlinear, multi-parameter functions. Thus, while a neural network model that uses a radial basis function (RBF) is illustrated herein as an example, the discussion should not be viewed as limiting—other types of neural networks can be applied in most embodiments.

As is known to those of ordinary skill in the art, an RBF neural network may have three layers: an input layer, a hidden layer, and an output layer. The hidden layer of the RBF network may comprise $H_1 \ldots H_j \ldots H_N$ locally tuned hidden units, which simultaneously collect multi-dimensional input vector X data ($X=X_1 \ldots X_p$). Each weighted output $w_j$ (selected from $w_1 \ldots w_j \ldots w_N$) of the N hidden units is calculated by close approximation of the input vector X to a multi-dimensional parameter vector associated with the corresponding hidden unit $H_j$. The response of each hidden unit $H_j$ inside the RBF network can be represented by a Gaussian basis function, as seen in equation (3):

$$H_j = \exp\left(-\frac{\|X - \mu_j\|^2}{2\sigma_j^2}\right), \qquad (3)$$

where $\mu_j$ and $\sigma_j$ are the mean and standard deviation of the hidden unit $H_j$ inputs from vector X.

The RBF neural network can be trained to determine: the number of neurons/hidden units N in the hidden layer, the coordinates of the center $\mu_j$ of each RBF, the radius (or spread) $\sigma_j$ of each RBF in each dimension, and the weights applied to the RBF function outputs $w_j$. A variety of methods can be used to train RBF networks. One of them, the k-means clustering algorithm, will now be described as part of a two-stage, non-limiting example.

In the first stage, the centers of each of the N RBFs are fixed to represent the density function of the input space using a dynamic k-means clustering algorithm. This can be accomplished by first initializing the set of RBF center $\mu_j$ to random values. Then, for any arbitrary input vector X, the closest RBF center $\mu_j$ is modified as shown in equation (4):

$$\mu_j^{new} = \mu_j^{new} + \alpha(X - \mu_j^{new}), \qquad (4)$$

where $\alpha$ is a learning rate that decreases over time. This stage of RBF network training places the weights of the RBF hidden units $H_j$ in regions where substantial data are present. The parameter $\sigma_j$ is set for each radial basis hidden unit $H_j$ to be approximately equal the average distance to the two closest adjacent radial basis hidden units, $H_{j-1}$ and $H_{j+1}$.

In the second stage of the RBF network training process, the weight vector of the output w is determined to best approximate the sample data vector input X, which leads to a linear optimization problem that can be solved by ordinary least-squares methods.

Once this is accomplished, the RBF neural network is trained, and the final output layer of the network can be calculated as the summation of the weighted outputs $w_1 \ldots w_j \ldots w_N$ and any given an input vector X, as shown in equation (5):

$$Y(X) = \sum_{j=1}^{N} w_j Z_j(X). \qquad (5)$$

Various example embodiments that can provide some or all of these advantages will now be described in detail.

FIG. 1 is a block diagram of apparatus 100 and systems 102 according to various embodiments of the invention. In some embodiments, the system 102 comprises one or more of the apparatus 100, which may include a housing 104. The housing 104 might take the form of a wireline tool body, or a down hole tool. Processor(s) 130 may be located at the surface 166, as part of a surface logging facility 156, or in a data acquisition system 124 above or below the Earth's surface 166, to be packaged with the apparatus 100, including the housing 104. The system 102 may comprise a data transceiver 144 (e.g., a telemetry transmitter and/or receiver) to transmit acquired data 170 from the sensors A, E, R, and S to the surface logging facility 156. Logic 140 can be used to acquire and process signals received from the apparatus 100, according to the various methods described herein. Received data can be stored in the memory 150, perhaps as part of a database 134. Thus, many embodiments may be realized.

Figure 2:
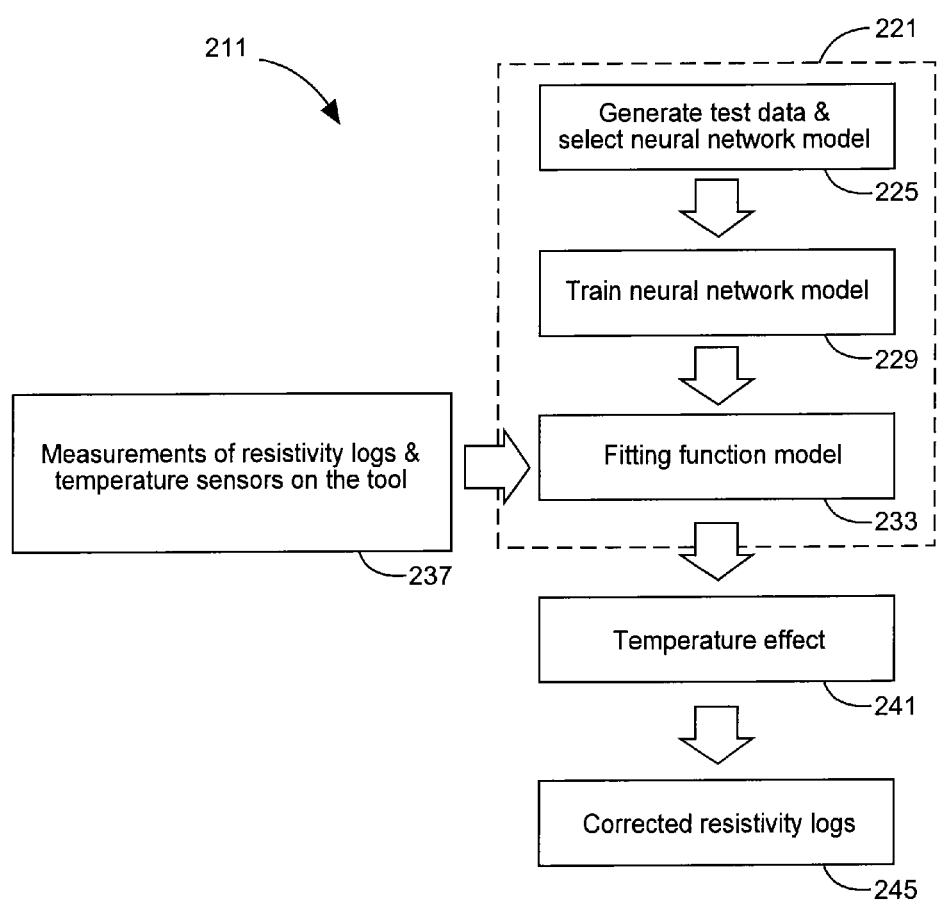
FIG. 2 is a flow chart illustrating several methods according to various embodiments of the invention.

FIG. 2 is a flow chart illustrating several methods 211 according to various embodiments of the invention. These methods 211 can be used to compensate for down hole temperature effects, and may be applied to a number of configurations of the apparatus 100 and system 102 shown in FIG. 1.

In method 211, the workflow for calculating temperature effects and conducting appropriate temperature correction for a variety of sensors, including those used in induction logging tools, is illustrated. First, a fitting function model is generated at block 233. This occurs as a result of training a neural network at block 229 using temperature effect test data (and a selected neural network model) obtained at block 225, as part of a training activity of block 221. Once a fitting function model has been generated at block 233, appropriate temperature correction can be applied to the actual field measurement data obtained at block 237 by applying temperature effect compensation at block 241 to obtain corrected log data at block 245 (e.g., corrected resistivity data is shown in the figure).

Although only one temperature distribution model has been described to this point, the method 211 can be extended to other temperature distribution models. For example, if two or more temperature sensors are used (e.g., refer to sensors A, E, and R in FIGS. 1 and 3), the temperature effect ($\Delta\sigma_T$) may be expressed as shown in equation (6):

$$\Delta\sigma_T = f(T_A, T_E, T_R, \ldots). \qquad (6)$$

where the effect $\Delta\sigma_T$ is now a function of three sensors, or more. The same methodology described above with respect to correcting the temperature effect on a single sensor S (see FIGS. 1 and 3) can be applied to generate a fitting model with three or more terms (i.e., N=3 or more) via the neural network training process, so as to correct the temperature effect on multiple sensors S.

Those of ordinary skill in the art will realize, after reading this disclosure and the attached figures, that the methods 211 can be accomplished using analog, digital, and/or combinations of these types of electronics. As is known to those of ordinary skill in the art, the system response frequency should be chosen so as to be outside of the frequency band of the data signal.

Figure 3:
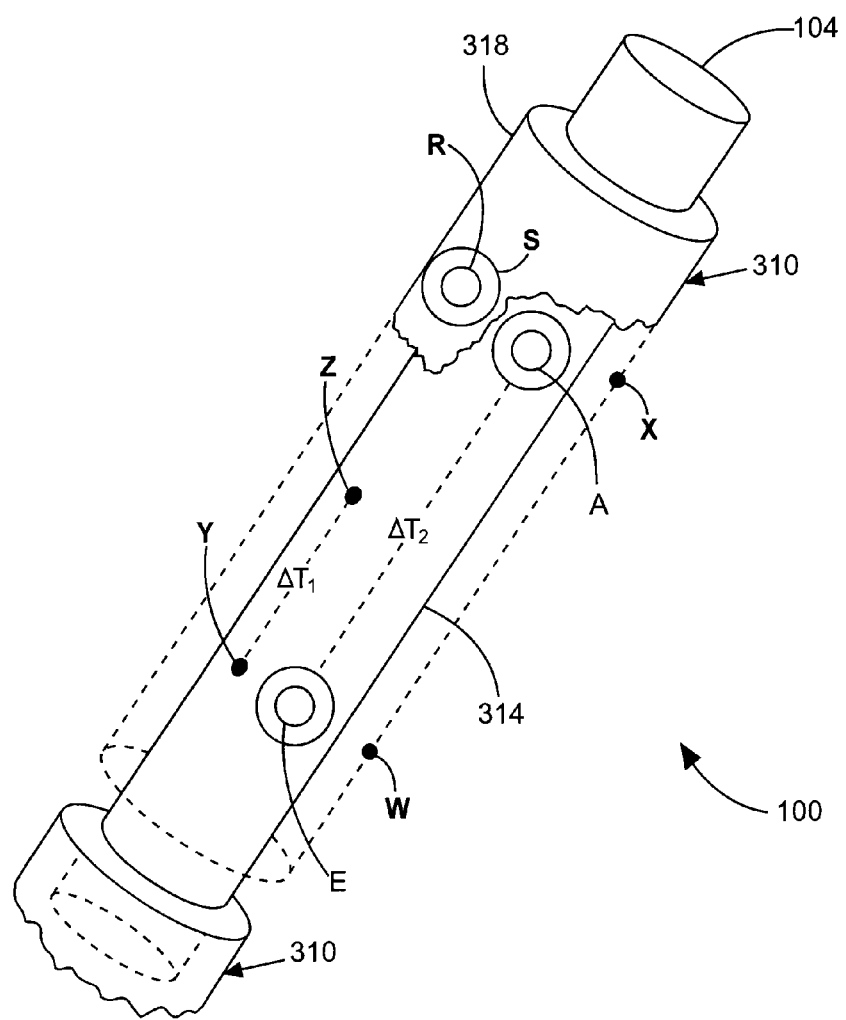
FIG. 3 illustrates a side, cut-away view of a housing with a temperature sensor mounting configuration according to various embodiments of the invention.

FIG. 3 illustrates a side, cut-away view of a housing 104 with a temperature sensor mounting configuration according to various embodiments of the invention. Here, the apparatus 100 includes the housing 104 (e.g., a down hole tool) and three temperature sensors A, E, and R, along with one or more tools sensors S, any one of which may form part of an induction coil. In addition, one or more of the sensors A, E, R, and S may form a portion of an induction coil array.

As stated earlier, the temperature effect is a function of the environmental temperature (e.g., down hole temperature) and temperature distribution inside the body of the housing 104. Thus, more than one sensor may be used to evaluate the temperature effect for a given situation.

The housing 104 may comprise one or more sub-arrays 310, including inductive sub-arrays. For each sub-array 310, the output of the environmental temperature sensor E can be combined with the output of the axial temperature sensor A and the radial temperature sensor R to provide an axial temperature distribution and a radial temperature distribution, respectively. These distributions can be used to evaluate the temperature effect on various sensors S (e.g., induction coils) having an output that is sensitive to temperature variations.

Because it may be inefficient and less effective to measure numerous temperatures and temperature differences for all sub-arrays 310 in the housing 104 (e.g., a multitude of temperature sensors can interfere with induction measurements), a reduced number of temperature sensors may be more useful. In the following description, a sensor configuration that uses temperature sensors A, E, and R will be described.

Experimental results have shown that axial temperature differences can be proportional to each other. In other words, the axial temperature difference $\Delta T_1$ between any given pair of points (Y, Z) on the inner wall 314 of the housing 104 can be linearly expressed using the temperature difference $\Delta T_2$ between another pair of points (e.g., between environmental temperature sensor E and axial temperature sensor A). Mathematically, this can be expressed as shown in equation (7):

$$\Delta T_{YZ} = \alpha \cdot (\Delta T_{AE}) + \beta \quad (7)$$

where points indicated by the locations of sensors A and E, and points Y and Z are all on the inner wall (e.g., feed pipe) 314 of the housing 104.

A similar relationship is found to exist between the temperature difference $\Delta T_{AE}$ along the inner wall (e.g., feed pipe) 314 and the temperature difference $\Delta T_{WX}$ along the outer surface 318 of the housing 104 (e.g., a mandrel surface). One can be expressed as a linear function of the other, as shown in equation (8):

$$\Delta T_{WX} = \chi \cdot (\Delta T_{AE}) + \gamma \quad (8)$$

where points "E" and "A" are on the inner wall 314, and points W and X are corresponding points on the outer surface 318 (e.g., on the outer surface of a mandrel).

Equations (7) and (8) permit the evaluation of temperature effects of any number of sub-arrays 310 on a housing 104 using one environmental temperature measurement (e.g., provided by environment temperature sensor E), one additional axial temperature measurement (e.g., provided by axial temperature sensor A) and one radial temperature measurement (e.g., provided by radial temperature sensor R). For example, two of the sensors A and E can be located along the feed pipe of a housing 104, and one of the sensors R can be located on the mandrel surface of the housing 104.

This embodiment makes use of a reduced number of temperature sensors. As shown in FIG. 3, the temperature effect is a function of the three temperature measurements obtained using the three sensors A, R, and E. This is shown in equation (9):

$$\Delta \sigma_T = f(T_A, T_E, T_R). \quad (9)$$

Additional experiments have determined that the radial temperature difference $\Delta T_{AR}$ can be estimated from an axial temperature derivative with respect to time $$\left( \frac{\partial T_A}{\partial t} \text{ or } \frac{\partial T_E}{\partial t} \right).$$

Thus, a two-temperature sensor scenario will now be described.

Using the directly-measured axial temperature, the radial temperature distribution can be estimated using the axial temperature derivative with respect to time. This is shown in equations (10), (11), and (12):

$$\Delta \sigma_T = f\left(T_A, T_E, \frac{\partial T_A}{\partial t}\right) \quad (10)$$

$$\Delta \sigma_T = f\left(T_A, T_E, \frac{\partial T_E}{\partial t}\right) \quad (11)$$

$$\Delta \sigma_T = f\left(T_A, T_E, \frac{\partial T_A}{\partial t}, \frac{\partial T_E}{\partial t}\right) \quad (12)$$

Any one of three equations can be used along with neural network training methods to create a fitting function model. As a result, for each sub-array 310 in a housing 104, three different fitting models can be calculated after applying neural network training. Thus, for each sub-array, fitting errors corresponding to the three models can be examined and compared, and the fitting model with the overall best fitting accuracy can be selected for use in the solution model (e.g., at block 233 in FIG. 2). This comparison approach can be used to enhance fitting accuracy and improve the accuracy of temperature compensation results during training and field use.

Thus, referring now to FIGS. 1-3, it can be seen that many embodiments may be realized, including an apparatus 100 that comprises two or more temperature sensors (axial temperature sensor A, environment temperature sensor E, and perhaps radial sensor R) and a processor 130 attached to a housing 104 (e.g., a down hole tool).

For example, in some embodiments an apparatus 100 comprises a housing 104 and at least two temperature sensors (e.g., sensors A and E) attached to the housing 104, where the temperature sensors operate to provide environmental temperature data (e.g., from sensor E) and axial temperature data (e.g., from sensor A). The apparatus 100 may further include a down hole sensor (e.g., sensor S) attached to the housing 104, the down hole sensor S to provide down hole log data.

In some embodiments, an additional temperature sensor (e.g., sensor R) is used to provide measured (instead of estimated) radial temperature data. The additional temperature sensor R may be attached to the outer surface (e.g., the mandrel surface) of the housing 104.

The apparatus 100 may further include a processor 130 housed by the housing 104, the processor 130 to apply temperature effects compensation associated with the environmental temperature data, the axial temperature data, radial temperature data (e.g., actual or estimated), and the down hole log data (collectively data 170) using a fitting function model obtained from a trained neural network, to transform the down hole log data into corrected log data D.

A memory can be located in the tool to store corrected log data. Thus, the corrected log data D may be stored in the memory 150, perhaps in a database 134.

Corrected log data can be sent to the surface for further processing. Thus, in some embodiments, a telemetry transmitter (e.g., forming part of the transceiver 144) can be used to communicate the corrected log data D to a surface logging facility 156. Additional embodiments may be realized, and thus, some examples of system embodiments will now be described.

Figure 4:
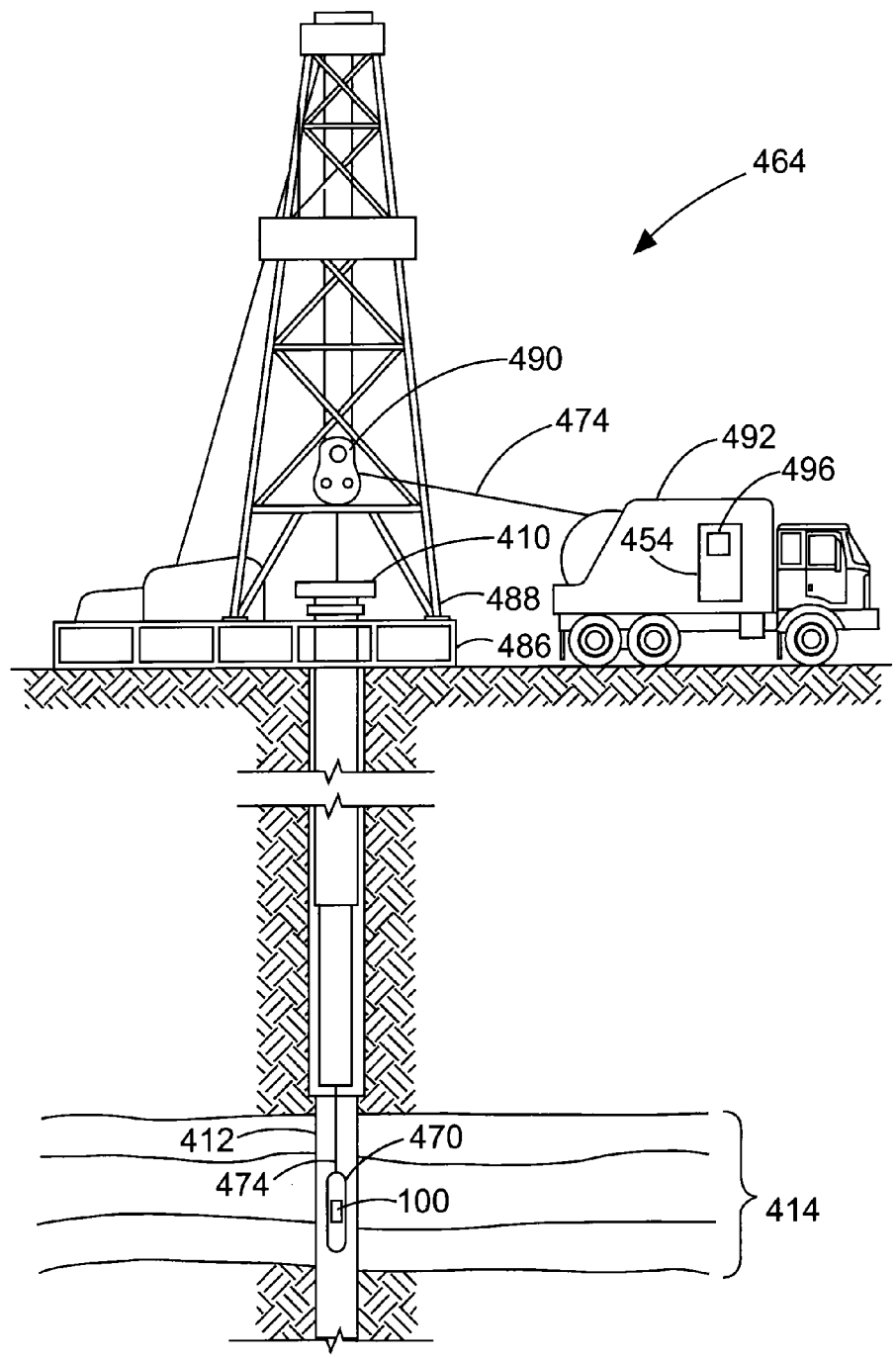
FIG. 4 illustrates a wireline system embodiment of the invention.
Figure 5:
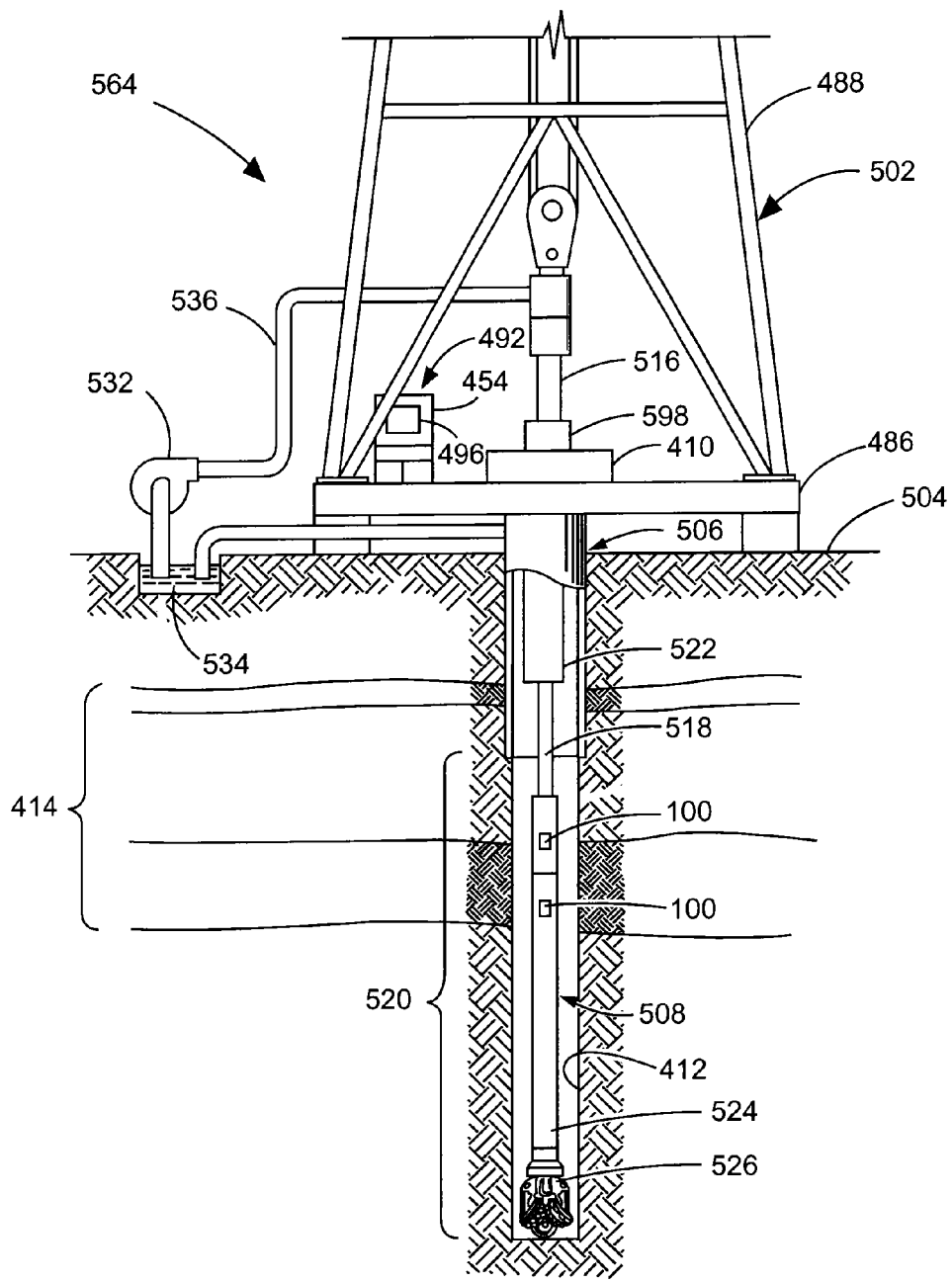
FIG. 5 illustrates a drilling rig system embodiment of the invention.

FIG. 4 illustrates a wireline system 464 embodiment of the invention, and FIG. 5 illustrates a drilling rig system 564 embodiment of the invention. Therefore, the systems 464, 564 may comprise portions of a wireline logging tool body 470 as part of a wireline logging operation, or of a down hole tool 524 as part of a down hole drilling operation.

Thus, FIG. 4 shows a well during wireline logging operations. In this case, a drilling platform 486 is equipped with a derrick 488 that supports a hoist 490.

Drilling oil and gas wells is commonly carried out using a string of drill pipes connected together so as to form a drilling string that is lowered through a rotary table 410 into a wellbore or borehole 412. Here it is assumed that the drilling string has been temporarily removed from the borehole 412 to allow a wireline logging tool body 470, such as a probe or sonde, to be lowered by wireline or logging cable 474 into the borehole 412. Typically, the wireline logging tool body 470 is lowered to the bottom of the region of interest and subsequently pulled upward at a substantially constant speed.

During the upward trip, at a series of depths various instruments (e.g., portions of the apparatus 100, or system 102 shown in FIG. 1) included in the tool body 470 may be used to perform measurements on the subsurface geological formations 414 adjacent the borehole 412 (and the tool body 470). The measurement data can be communicated to a surface logging facility 492 for processing, analysis, and/or storage. The logging facility 492 may be provided with electronic equipment for various types of signal processing, which may be implemented by any one or more of the components of the apparatus 100 or system 102 in FIG. 1. Similar formation evaluation data may be gathered and analyzed during drilling operations (e.g., during LWD operations, and by extension, sampling while drilling).

In some embodiments, the tool body 470 is suspended in the wellbore by a wireline cable 474 that connects the tool to a surface control unit (e.g., comprising a workstation 454). The tool may be deployed in the borehole 412 on coiled tubing, jointed drill pipe, hard wired drill pipe, or any other suitable deployment technique.

Turning now to FIG. 5, it can be seen how a system 564 may also form a portion of a drilling rig 502 located at the surface 504 of a well 506. The drilling rig 502 may provide support for a drill string 508. The drill string 508 may operate to penetrate the rotary table 410 for drilling the borehole 412 through the subsurface formations 414. The drill string 508 may include a Kelly 516, drill pipe 518, and a bottom hole assembly 520, perhaps located at the lower portion of the drill pipe 518.

The bottom hole assembly 520 may include drill collars 522, a down hole tool 524, and a drill bit 526. The drill bit 526 may operate to create the borehole 412 by penetrating the surface 504 and the subsurface formations 414. The down hole tool 524 may comprise any of a number of different types of tools including MWD tools, LWD tools, and others.

During drilling operations, the drill string 508 (perhaps including the Kelly 516, the drill pipe 518, and the bottom hole assembly 520) may be rotated by the rotary table 410. Although not shown, in addition to, or alternatively, the bottom hole assembly 520 may also be rotated by a motor (e.g., a mud motor) that is located down hole. The drill collars 522 may be used to add weight to the drill bit 526. The drill collars 522 may also operate to stiffen the bottom hole assembly 520, allowing the bottom hole assembly 520 to transfer the added weight to the drill bit 526, and in turn, to assist the drill bit 526 in penetrating the surface 504 and subsurface formations 414.

During drilling operations, a mud pump 532 may pump drilling fluid (sometimes known by those of ordinary skill in the art as "drilling mud") from a mud pit 534 through a hose 536 into the drill pipe 518 and down to the drill bit 526. The drilling fluid can flow out from the drill bit 526 and be returned to the surface 504 through an annular area 540 between the drill pipe 518 and the sides of the borehole 412. The drilling fluid may then be returned to the mud pit 534, where such fluid is filtered. In some embodiments, the drilling fluid can be used to cool the drill bit 526, as well as to provide lubrication for the drill bit 526 during drilling operations. Additionally, the drilling fluid may be used to remove subsurface formation cuttings created by operating the drill bit 526.

Thus, referring now to FIGS. 1 and 3-5, it may be seen that in some embodiments, the systems 464, 564 may include a drill collar 522, a down hole tool 524, and/or a wireline logging tool body 470 to house one or more apparatus 100, similar to or identical to the apparatus 100 described above and illustrated in FIG. 1. Components of the system 102 in FIG. 1 may also be housed by the tool 524 or the tool body 470.

Thus, for the purposes of this document, the term "housing" may include any one or more of a drill collar 522, a down hole tool 524, or a wireline logging tool body 470 (all having an outer surface, to enclose or attach to magnetometers, sensors, fluid sampling devices, pressure measurement devices, temperature measurement devices, transmitters, receivers, acquisition and processing logic, and data acquisition systems). The tool 524 may comprise a down hole tool, such as an LWD tool or MWD tool. The wireline tool body 470 may comprise a wireline logging tool, including a probe or sonde, for example, coupled to a logging cable 474. Many embodiments may thus be realized.

For example, in some embodiments, a system 464, 564 may include a display 496 to present temperature measurement information, both measured and processed/calculated, as well as database information, perhaps in graphic form. A system 464, 564 may also include computation logic, perhaps as part of a surface logging facility 492, or a computer workstation 454, to receive signals from transmitters and to send signals to receivers, and other instrumentation to determine properties of the formation 414.

Thus, a system 464, 564 may comprise a down hole tool body, such as a wireline logging tool body 470 or a down hole tool 524 (e.g., an LWD or MWD tool body), and portions of one or more apparatus 100 attached to the tool body, the apparatus 100 to be constructed and operated as described previously. The processor(s) 130 in the systems 464, 564 may be attached to the housing 104, or located at the surface, as part of a surface computer (e.g., in the surface logging facility 156) as shown in FIG. 1.

The apparatus 100; systems 102, 464, 564; housing 104; data acquisition system 124; processors 130; database 134; logic 140; transceiver 144; memory 150; surface logging facility 156; surface 166; sub-arrays 310; inner wall 314; outer surface 318; data 170; rotary table 410; borehole 412; computer workstations 454; wireline logging tool body 470; logging cable 474; drilling platform 486; derrick 488; hoist 490; logging facility 492; display 496; drill string 508; Kelly 516; drill pipe 518; bottom hole assembly 520; drill collars 522; down hole tool 524; drill bit 526; mud pump 532; mud pit 534; hose 536; temperature sensors A, E, and R; corrected log data D; and tool sensors S may all be characterized as "modules" herein.

Such modules may include hardware circuitry, and/or a processor and/or memory circuits, software program modules and objects, and/or firmware, and combinations thereof, as desired by the architect of the apparatus 100 and systems 102, 464, 564 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 100 and systems 102, 464, 564 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 6:
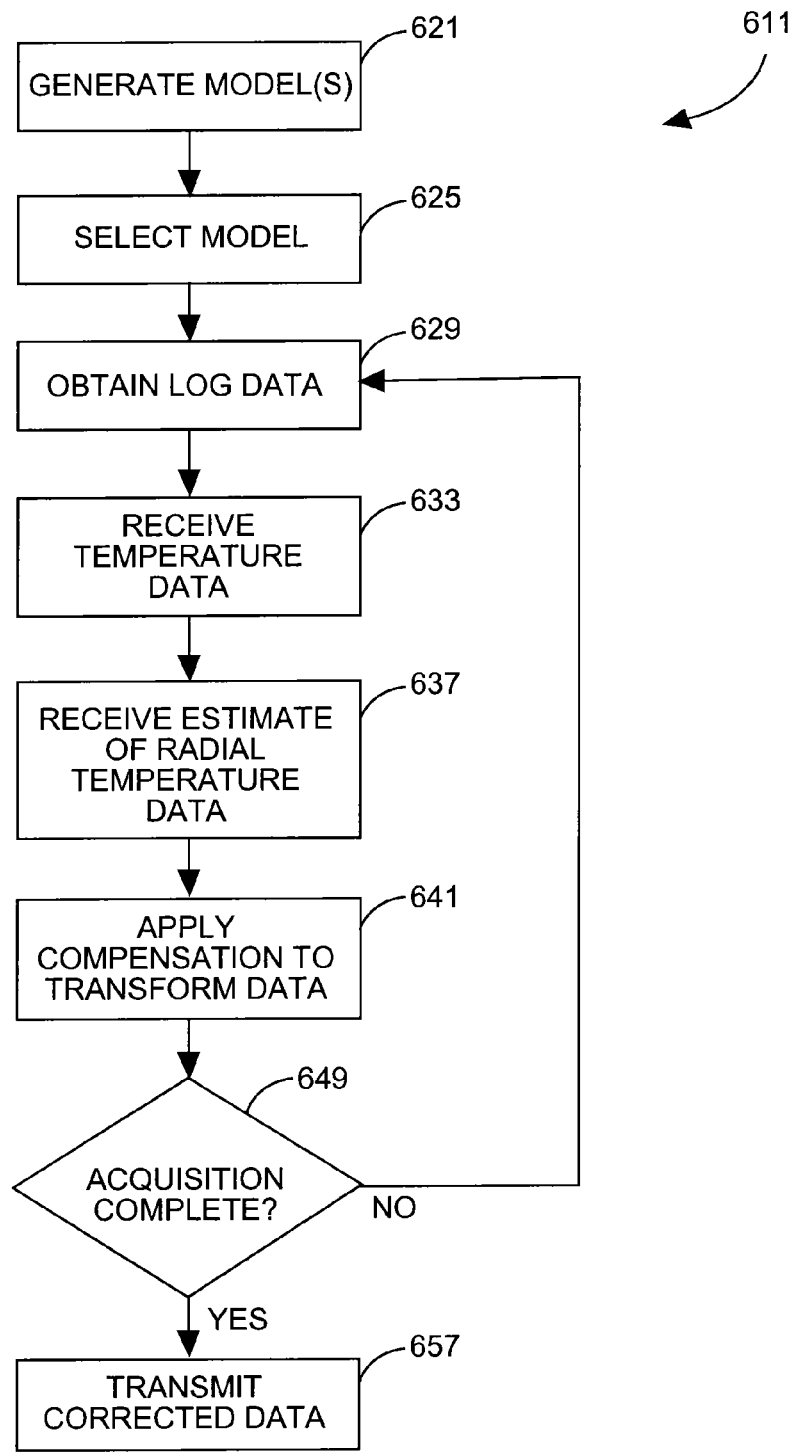
FIG. 6 is a flow chart illustrating several additional methods according to various embodiments of the invention.

For example, FIG. 6 is a flow chart illustrating several additional methods 611 according to various embodiments of the invention. One method 611 may comprise receiving a set of temperature data at block 633, and using a trained neural network and the temperature data to correct down hole log data at block 641.

In some embodiments, tool-specific experimental data for a resistivity tool can be obtained over a range of temperatures in an oven, and used to train the neural network. For example, temperature sensor values generated by immersion in the oven environment, and laboratory logging tool measurement data can be entered into a neural network, and the network can be configured and trained so that the output from the network provides a fitting function model characterizing the temperature effects of the down hole logging tool.

Thus, a processor-implemented temperature compensation method 611 may begin at block 621 with generating one or more fitting function models by training the neural network using tool-specific experimental data and a range of measured temperature behavior with at least two axially-located temperature sensors on a down hole tool.

The value of training parameters applied to the neural network hidden units and/or weighted output can be used to determine the characteristics of the fitting function model. Thus, the activity at block 621 may include selecting training parameters associated with the fitting function model.

The parameters can be selected to minimize fitting errors. Thus, selecting the training parameters may comprise selecting the training parameters to minimize fitting errors between expected output data and measured output data obtained during training of the neural network.

Sensor types having temperature-sensitive output that is amenable to correction using the methods 661 include vibrating tube densitometers, quartz pressure gauges, crystal-based neutron detectors, and array induction tools. Thus, at block 625, the method 611 may comprise selecting the fitting function model based on the type of sensor S (see FIGS. 1 and 3) used to provide the down hole log data.

Fitting function models can be selected based on temperature sensor configurations. Thus, the activity at block 625 may include selecting the fitting function model based on a down hole tool physical configuration of two or more temperature sensors.

The fitting function model can be selected from several models corresponding to combinations of measured temperatures and estimated temperatures (e.g., estimates obtained from temperature derivatives with respect to time). Thus, the activity at block 625 may comprise selecting the fitting function model from one of multiple models respectively based on combinations of measured and estimated values corresponding to the environmental temperature data, the axial temperature data, and the radial temperature data.

Down hole log data may comprise a variety of information, including the temperature data measured by various sensors, and/or resistivity data, such as the resistivity data obtained from an induction tool. Thus, the method 611 may continue on to block 629 to include obtaining the down hole log data as formation resistivity data from an induction logging tool.

In some embodiments, a short spacing array may be used to provide the down hole log data. Thus, the activity at block 629 may comprise obtaining the down hole log data from a short spacing array, including an array having a spacing between a transmitter (coil) and a receiver (coil) of less than one meter.

The method 611 may continue on to block 633 to include receiving environmental temperature data, axial temperature data, radial temperature data, and down hole log data in the down hole environment.

In many embodiments, temperature data is received from a temperature sensor attached to a down hole tool, such as a resistivity tool. Thus, the activity at block 633 may comprise receiving the environmental temperature data from at least one sensor attached to a tool, including a formation resistivity measurement tool.

The received radial temperature data may comprise actual (measured) data or estimated data, as described previously. Thus, the method 611 may continue on to block 637 to include receiving an estimate of a radial temperature based on the environmental temperature data and the axial temperature data.

The radial temperature data can be estimated from temperature derivatives associated with measurements provided by one or both axial temperature sensors (e.g., sensors A and E in FIGS. 1 and 3). Thus, the activity at block 637 may comprise estimating the radial temperature data as a temperature from a temperature derivative with respect to time of the environmental temperature data and/or the axial temperature data.

The method 611 may then continue on to block 641 to include applying temperature effects compensation associated with the environmental temperature data, the axial temperature data, the radial temperature data, and the down hole log data using a fitting function model obtained from a trained neural network, to transform the down hole log data into corrected log data.

Many types of neural networks can be used, including feed-forward networks, radial basis networks, dynamic networks, learning vector quantization, and others. As one of these types, the RBF is a useful basis function format for neural networks used in several embodiments. Thus, the neural network used at block 641 may comprise an RBF neural network.

Temperature effects compensation may be accomplished using a fitting function model for a wide variety of tools, including an array induction tool. Thus, applying the temperature effects compensation at block 641 may comprise applying the temperature effects compensation using a fitting function model associated with training the neural network using array induction tool measurement data.

In some embodiments, the method 611 may include correcting the output of one or more temperature sensors having output measurements that are also affected by temperature variations down hole, so that they can be used as temperature sensors per se (e.g., as a temperature sensor S shown in FIG. 1) in that environment, providing more accurate results. This can be accomplished more usefully after the neural network is trained with test data, perhaps in a laboratory environment using a range of known, controlled temperatures, as described previously.

At block 649, the method 611 may operate to determine whether acquisition of logging data is complete. If not, the method 611 may return to block 629 to acquire additional down hole log data.

If data acquisition is complete, as determined at block 649, the corrected log data may be displayed on a display. Thus, the method 611 may continue on to block 657 to include transmitting the corrected log data to a display.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIGS. 2 and 6) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 7:
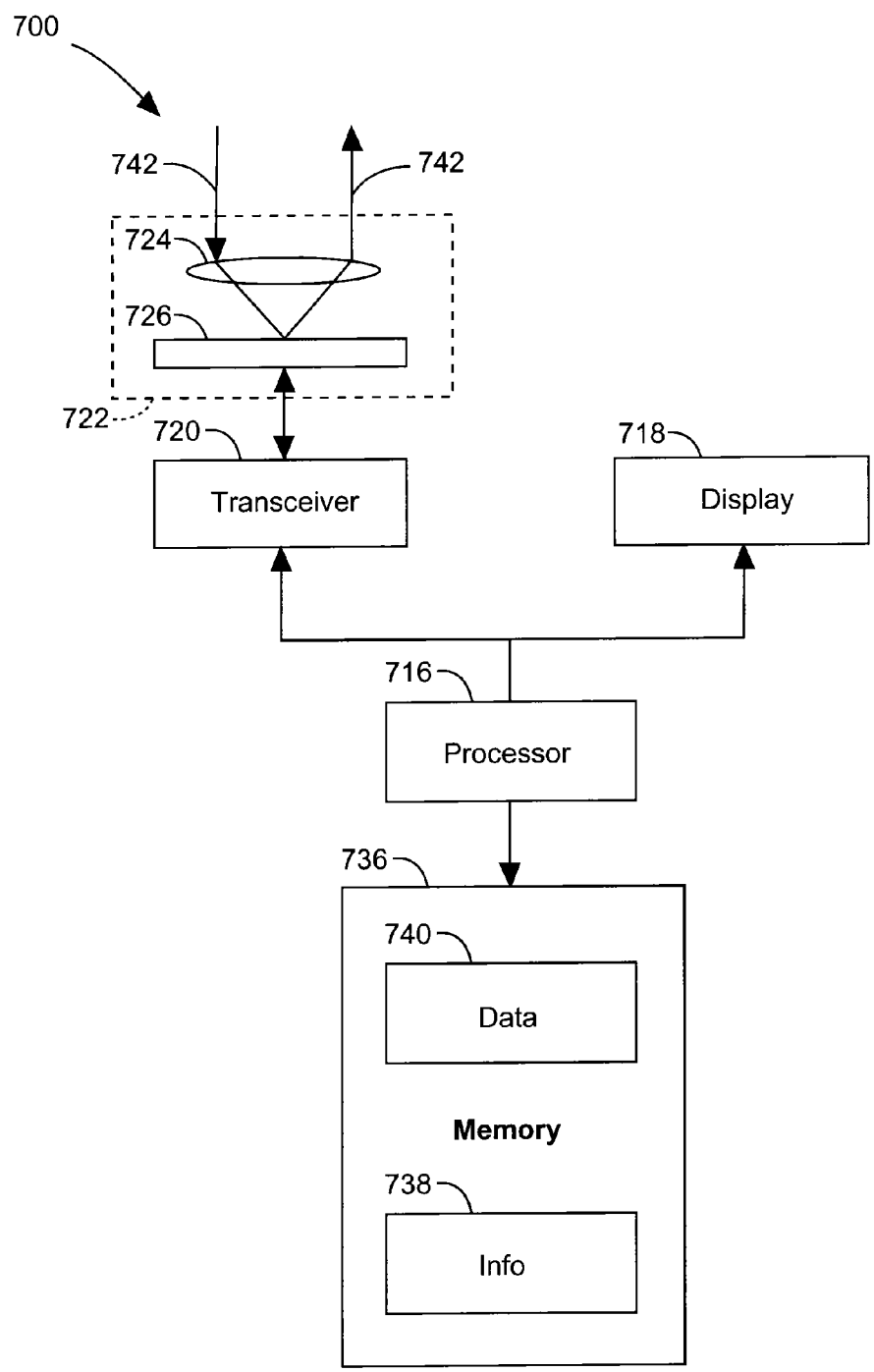
FIG. 7 is a block diagram of an article according to various embodiments of the invention.

For example, FIG. 7 is a block diagram of an article 700 of manufacture according to various embodiments, such as a computer, a memory system, a magnetic or optical disk, or some other storage device. The article 700 may include one or more processors 716 coupled to a machine-accessible medium such as a memory 736 (e.g., removable storage media, as well as any tangible, non-transitory memory including an electrical, optical, or electromagnetic conductor) having associated information 738 (e.g., computer program instructions and/or data), which when executed by one or more of the processors 716, results in a machine (e.g., the article 700) performing any actions described with respect to the methods of FIGS. 2 and 6, the apparatus of FIG. 1, and the systems of FIGS. 1, 4, and 5. The processors 716 may comprise one or more processors sold by Intel Corporation (e.g., Intel® Core™ processor family), Advanced Micro Devices (e.g., AMD Athlon™ processors), and other semiconductor manufacturers.

In some embodiments, the article 700 may comprise one or more processors 716 coupled to a display 718 to display data processed by the processor 716 and/or a wireless transceiver 720 (e.g., a down hole telemetry transceiver) to receive and transmit data processed by the processor.

The memory system(s) included in the article 700 may include memory 736 comprising volatile memory (e.g., dynamic random access memory) and/or non-volatile memory. The memory 736 may be used to store data 740 processed by the processor 716.

In various embodiments, the article 700 may comprise communication apparatus 722, which may in turn include amplifiers 726 (e.g., preamplifiers or power amplifiers) and one or more antenna 724 (e.g., transmitting antennas and/or receiving antennas). Signals 742 received or transmitted by the communication apparatus 722 may be processed according to the methods described herein.

Many variations of the article 700 are possible. For example, in various embodiments, the article 700 may comprise a down hole tool, including the apparatus 100 shown in FIG. 1. In some embodiments, the article 700 is similar to or identical to the apparatus 100 or system 102 shown in FIG. 1. Some of the potential benefits of implementing the various embodiments described herein will now be described.

Figure 8:
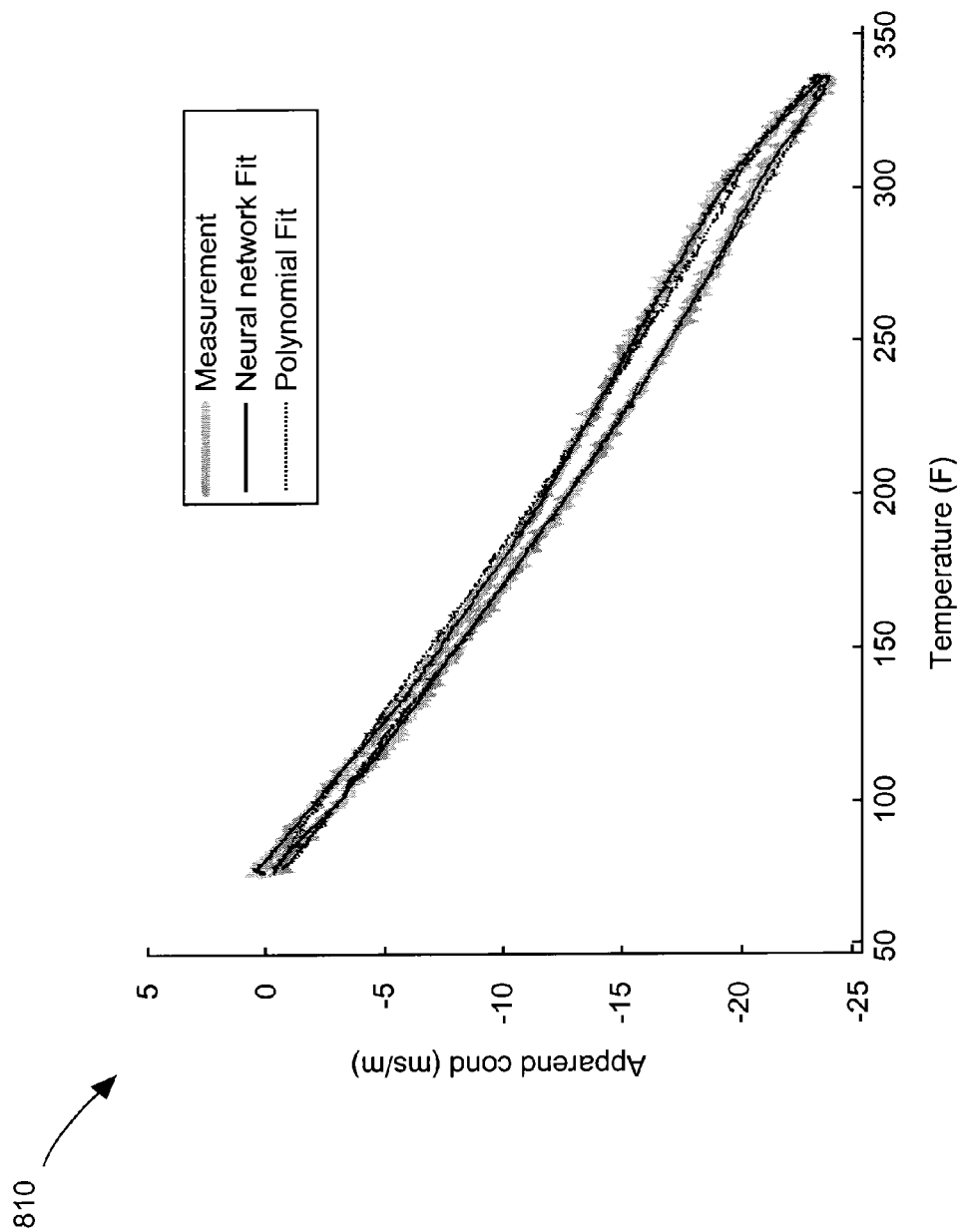
FIG. 8 illustrates temperature effects correction for data acquired using a 15 cm induction array coil at 36 kHz according to various embodiments of the invention.
Figure 9:
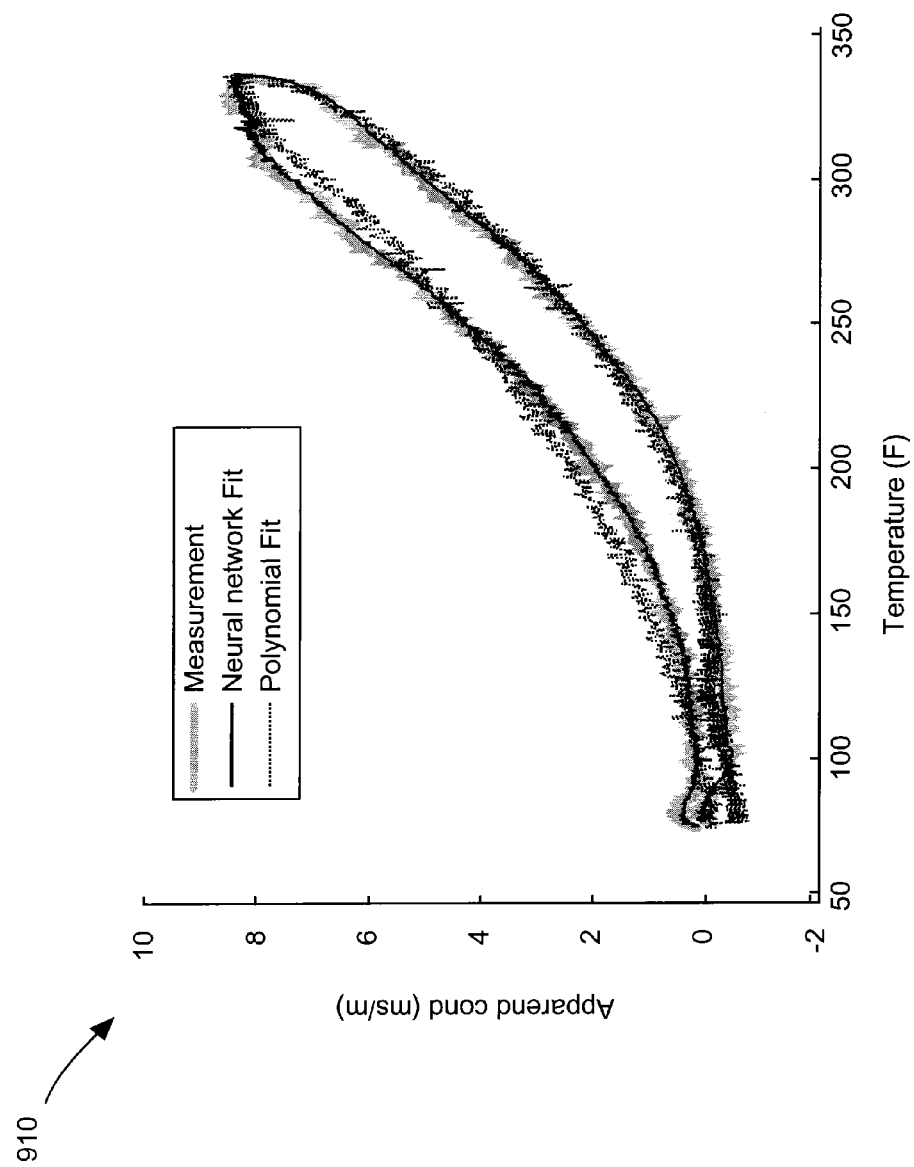
FIG. 9 illustrates temperature effects correction for data acquired using a 15 cm induction array coil at 72 kHz according to various embodiments of the invention.

FIG. 8 illustrates temperature effects correction for data acquired using a 15 cm induction array coil at 36 kHz according to various embodiments of the invention. FIG. 9 illustrates temperature effects correction for data acquired using a 15 cm induction array coil at 72 kHz according to various embodiments of the invention.

To provide the data shown in graphs 810, 910 of FIGS. 8 and 9, respectively, a Halliburton H-ACRt™ logging system with a single temperature sensor was characterized to provide a basis for comparison with an embodiment of one of the methods described herein. First, temperature effects on a 29-inch array coil of the tool at 36 KHz and 72 KHz were analyzed and processed using conventional least-squares polynomial fitting, as is known to those of ordinary skill in the art. The expected environmental measurement data is shown by the solid line in graphs 810, 910, and the least-squares, polynomial-corrected fit data is shown by the dotted line in the graphs 810, 910. The corrected data generated using the methods described herein are shown with dashed lines.

It can be seen that the least-squares polynomial fitting data agrees fairly well with the measurement data at 36 KHz (see graph 810), as does the neural network corrected data. However, at 72 KHz (see graph 910) it is apparent that neural network correction outperforms the least-squares polynomial fitting method. That is, the neural network model can produce results that are closer to the expected measurement data, providing a reasonably smooth curve in the presence of noisy/non-smooth signal data.

In summary, the apparatus, systems, and methods disclosed herein, using environmental, axial, and radial temperature data, may provide increased accuracy with respect to conventional sensor data compensation mechanisms. The use of a reduced number of sensors, and a trained neural network may also be more efficient.

For example, the proposed correction methods can be easily modified to characterize different temperature correction schemes with different temperature sensor configurations for various types of logging tools, including induction logging tools with short-spacing arrays. As a result, the value of the services provided by an operation/exploration company may be significantly enhanced.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
a down hole tool;
at least two temperature sensors attached to the down hole tool, the at least two temperature sensors to provide environmental temperature data and axial temperature data;
a down hole sensor attached to the down hole tool, the down hole sensor to provide down hole log data; and
a processor housed by the down hole tool, the processor to apply temperature effects compensation associated with combination of the environmental temperature data and one or more of the axial temperature data and radial temperature data, and the down hole log data using a fitting function model obtained from a trained neural network to transform the down hole log data into corrected log data.

2. The apparatus of claim 1, further comprising:
an additional temperature sensor to provide the radial temperature data, the additional temperature sensor attached to a mandrel surface of the down hole tool.

3. The apparatus of claim 1, further comprising:
a telemetry transmitter to communicate the corrected log data to a surface logging facility.

4. A system comprising:
a down hole tool;
at least two temperature sensors to provide environmental temperature data and axial temperature data;
a down hole sensor to provide down hole log data, the down hole sensor attached to the down hole tool; and
a processor to apply temperature effects compensation associated with combination of the environmental temperature data and one or more of the axial temperature data and radial temperature data, and the down hole log data using a fitting function model obtained from a trained neural network to transform the down hole log data into corrected log data and down hole log data.

5. The system of claim 4, wherein the downhole tool comprises one of a wireline tool or a measurement while drilling tool.

6. The system of claim 4, wherein at least one of the at least two temperature sensors comprise a portion of an induction coil array.

7. A processor-implemented temperature compensation method, to execute on one or more processors that perform the method comprising:
receiving environmental temperature data, axial temperature data, radial temperature data, and down hole log data; and
applying temperature effects compensation associated with combination of the environmental temperature data and one or more of the axial temperature data and the radial temperature data, and the down hole log data using a fitting function model obtained from a trained neural network to transform the down hole log data into corrected log data.

8. The method of claim 7, wherein the neural network comprises a radial basis function neural network.

9. The method of claim 7, wherein receiving the radial temperature data comprises:
receiving an estimate of a radial temperature based on the environmental temperature data and/or the axial temperature data.

10. The method of claim 7, wherein the receiving comprises:
receiving the environmental temperature data from at least one sensor attached to a formation resistivity measurement tool.

11. The method of claim 7, further comprising:
obtaining the down hole log data as formation resistivity data from an induction logging tool.

12. The method of claim 7, further comprising:
generating the fitting function model by training the neural network on tool-specific experimental data and a range of measured temperature behavior using at least two axially-located temperature sensors on a down hole tool.

13. The method of claim 7, further comprising:
selecting the fitting function model based on a sensor type used to provide the down hole log data.

14. The method of claim 7, further comprising:
selecting the fitting function model based on a down hole tool physical configuration of at least two temperature sensors.

15. The method of claim 7, further comprising:
selecting training parameters associated with the fitting function model.

16. The method of claim 15, wherein selecting the training parameters comprises:
selecting the training parameters to minimize fitting errors between expected output data and measured output data obtained during training of the neural network.

17. The method of claim 7, wherein applying the temperature effects compensation comprises:
applying the temperature effects compensation using a fitting function model associated with training the neural network using array induction tool measurement data.

18. The method of claim 7, further comprising:
selecting the fitting function model from one of multiple models respectively based on combinations of measured and estimated values corresponding to the environmental temperature data, the axial temperature data, and the radial temperature data.

19. An article including a machine-accessible medium having instructions stored therein, wherein the instructions, when accessed, result in a machine compensating temperature data by performing:

receiving environmental temperature data, axial temperature data, radial temperature data, and down hole log data; and applying temperature effects compensation associated with combination of the environmental temperature data and one or more of the axial temperature data and the radial temperature data, and the down hole log data using a fitting function model obtained from a trained neural network to transform the down hole log data into corrected log data.

20. The article of claim 19, wherein the instructions, when accessed, result in a machine compensating temperature data by performing:

transmitting the corrected log data to a display.

21. The article of claim 19, wherein the instructions, when accessed, result in a machine compensating temperature data by performing:

obtaining the down hole log data from a short spacing array having a spacing between a transmitter and a receiver of less than one meter.

22. The article of claim 19, wherein the instructions, when accessed, result in a machine compensating temperature data by performing:

estimating the radial temperature data as a temperature from a temperature derivative with respect to time of the environmental temperature data and/or the axial temperature data.

* * * * *